United States Patent
Cheng et al.

(10) Patent No.: US 7,782,753 B2
(45) Date of Patent: Aug. 24, 2010

(54) METHOD OF CHANNEL ESTIMATION

(75) Inventors: Shin-Shiuan Cheng, Hsinhua (TW);
Ju-Chun Wu, Hsinhua (TW)

(73) Assignee: Himax Technologies Ltd., Tainan County (TW)

( * ) Notice: Subject to any disclaimer, the term of this patent is extended or adjusted under 35 U.S.C. 154(b) by 869 days.

(21) Appl. No.: 11/583,169

(22) Filed: Oct. 19, 2006

(65) Prior Publication Data

US 2007/0092016 A1    Apr. 26, 2007

(30) Foreign Application Priority Data

Oct. 21, 2005   (TW) .............................. 94136948 A

(51) Int. Cl.
*H04J 11/00*    (2006.01)

(52) U.S. Cl. ...................................................... 370/208

(58) Field of Classification Search ....................... None
See application file for complete search history.

(56) References Cited

U.S. PATENT DOCUMENTS 7,539,259 B2 *   5/2009   Dias et al. .................... 375/267

OTHER PUBLICATIONS

Wei Wu et al., "Wireless Communication Project (EE381K-11) Technical Report Optimal Channel Estimation for Capacity Maximization in OFDM Systems", May 6, 2003.

* cited by examiner

*Primary Examiner*—Raj Jain
(74) *Attorney, Agent, or Firm*—Rabin & Berdo, P.C.

(57) ABSTRACT

A method of channel estimation used in an orthogonal frequency division multiplexing (OFDM) system. Firstly, a plurality of synchronized signals are received respectively from a plurality of sub-channels, and the channel responses of two sub-channels are known. Then, the channel responses of other channels are estimated by the statistical property derived from Jake's model according to two sub-channels whose channel responses are known.

7 Claims, 3 Drawing Sheets

METHOD OF CHANNEL ESTIMATION

This application claims the benefit of Taiwan application Serial No. 94136948, filed Oct. 21, 2005, the subject matter of which is incorporated herein by reference.

BACKGROUND OF THE INVENTION

1. Field of the Invention

The invention relates in general to a method of channel estimation, and more particularly to a method of channel estimation of an OFDM system.

2. Description of the Related Art

Orthogonal frequency division multiplexing (OFDM) has the advantage of anti-multi-path interference and is currently adopted as the specification of digital video broadcasting-terrestrial (DVB-T) transmission.

The OFDM system spread the data to several sub-channels to be transmitted by multi-carrier modulation. The sub-carrier frequency of each sub-channel is different and orthogonal to each other such that each sub-channel can apply a lower transmission rate. Since the sub-carrier frequency of each sub-channel is different, the influence that each sub-channel receives during transmission also differs. The influence that each sub-channel receives is estimated at the reception end. That is, the channel response of the sub-channel is estimated, whereby the received signal is compensated to obtain the correct signal.

There are several methods for estimating channel response such as pilot-based channel estimation for instance. Referring to FIG. 1, a pilot pattern of an OFDM system is shown. Each circle denotes the data transmitted by a sub-channel at a time point, the horizontal axis is sub-channel C, and the vertical axis is time t. At each time point, a group of synchronized signals S including a plurality of signals modulated to the sub-channels are received. The black circle denotes the response signal. The contents of the response signal and the position of the response signal on the frequency-time grid are known to both the transmission end and the reception end. Therefore, the reception end can obtains the channel response of the sub-channel transmitting the response signal by comparing the received response signal with the known response signal.

Other channel responses of the sub-channels transmitting data signals can be obtained by the linear interpolation of the channel response of the known sub-channels. Examples of linear interpolation include time-domain interpolation and frequency-domain interpolation. For example, the method of estimating the channel response of the sub-channel C (1) at time point t2 is shown in FIG. 2. Referring to FIG. 1. The black points denote response signals, so the channel responses of the sub-channels are known. For example, the channel response of the sub-channel C (3) is $A_{31}*\exp(j\theta_{31})$ at the time point t1, the channel response of the sub-channel C (3) is $A_{35}*\exp(j\theta_{35})$ at the time point t5, wherein A is an amplitude response of the sub-channel, and $\theta$ is a phase response of the sub-channel. Firstly, the method begins at step 201, since the ratio of the difference between the time point t2 and the time point t1 to the difference between the time point t2 and the time point t5 is 1:3, the amplitude response $A_{32}$ of the sub-channel C (3) at time point t2 is expressed as $A_{32} = (A_{31}*3/4 + A_{35}*1/4)$ and the phase response $\theta_{32}$ of the sub-channel C (3) at time point t2 is expressed as $\theta_{32} = (\theta_{31}*3/4 + \theta_{35}*1/4)$ by time-domain linear interpolation.

Next, proceed to step 203, since the ratio of the sub-carrier frequency difference between the sub-channel C (1) and the sub-channel C (0) to the sub-carrier frequency difference between the sub-channel C (1) and the sub-channel C (3) is 1:2, the amplitude response of the sub-channel C (1) at time point t2 is expressed as $A_{12} = (A_{02}*2/3 + A_{32}*1/3)$ and the phase response of the sub-channel C (1) at time point t2 is expressed as $\theta_{12} = (\theta_{02}*2/3 + \theta_{32}*1/3)$ by frequency-domain linear interpolation.

However, the above channel estimation obtained by linear interpolation is not actual channel response, so the estimation is not precise enough and the quality of the received signals is affected.

SUMMARY OF THE INVENTION

It is therefore an object of the invention to provide a method for precisely estimating channel response.

The invention achieves the above-identified object by providing a method of channel estimation used in an orthogonal frequency division multiplexing (OFDM) system. Firstly, a plurality of synchronized signals are received respectively from a plurality of sub-channels of the OFDM system, wherein the $i^{th}$ and the $j^{th}$ sub-channel responses are known, i+n=j, i, n and j are positive integers. Then, the channel response of the $(i+k)^{th}$ sub-channel is estimated according to the statistical properties of the channel response derived from Jake's model and the channel responses of the $i^{th}$ and the $j^{th}$ sub-channels, wherein k<n and k is a positive integer.

Other objects, features, and advantages of the invention will become apparent from the following detailed description of the preferred but non-limiting embodiments. The following description is made with reference to the accompanying drawings.

DETAILED DESCRIPTION OF THE INVENTION

The accuracy of conventional method of estimating the channel response by linear interpolation is insufficient. The amplitude correlation coefficient and the phase correlation coefficient of the channel responses of two sub-channels spaced by a predetermined frequency are derived from Jake's model. The amplitude correlation coefficient $\rho_c$ of the channel response derived from Jake's model is expressed as:

$$\rho_c(s, \tau) = \frac{J_0^2(\omega_m \tau)}{1 + s^2 \sigma^2} \qquad (1)$$

wherein, $J_0$ is a zeroth order Bessel function of first kind, $\omega_m$ is a Doppler frequency, $\tau$ is a time delay, s is the frequency difference between two carriers, and $\sigma$ is a delay spread.

The above parameters $\omega_m$, $\tau$, $\sigma$ which can be obtained by other methods are regarded as known and are not elaborated here. Therefore, the amplitude correlation coefficient $\rho_c$ between two carriers can be obtained according to the frequency difference s The phase correlation coefficient $\rho_\theta$ of the channel response derived from Jake's model is expressed as:

$$\rho_\theta(s,\tau) = 3\Gamma(\lambda,\phi)[1+2\Gamma(\lambda,\phi)] - \frac{1}{8}\Omega(\lambda) \quad (2)$$

$$\text{wherein, } \Gamma(\lambda,\phi) = \frac{1}{2\pi}\sin^{-1}(\lambda\cos\phi)$$

$$\Omega(\lambda) = \frac{6}{\pi^2}\sum_{n=1}^{\infty}\frac{\lambda^{2n}}{n^2}, \Omega(1) = 1$$

$$\tan\phi = -s\sigma, \lambda^2 = \frac{J_0^2(\omega_m\tau)}{1+s^2\sigma^2}$$

In the above expression, the phase correlation coefficient $\rho_\theta$ between two carriers can be obtained according to the frequency differences. The invention estimates the channel response of the channel by Jake's model. Examples of the channel response include amplitude response and phase response.

Figure 1:
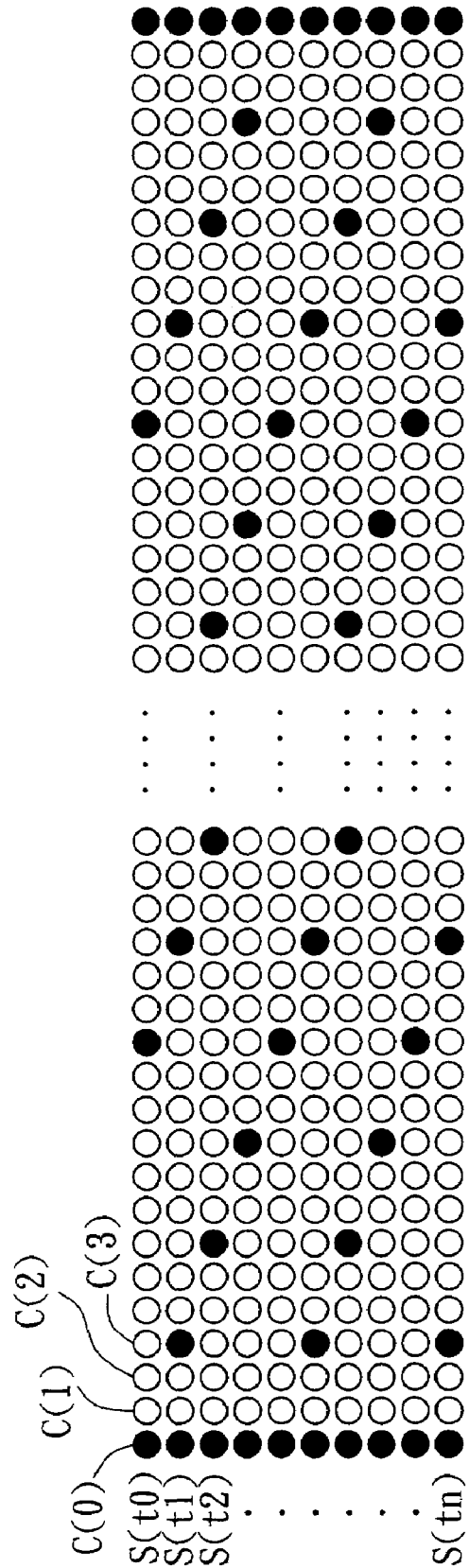
FIG. 1 (PRIOR ART) is a pilot pattern of an OFDM system.
Figure 2:
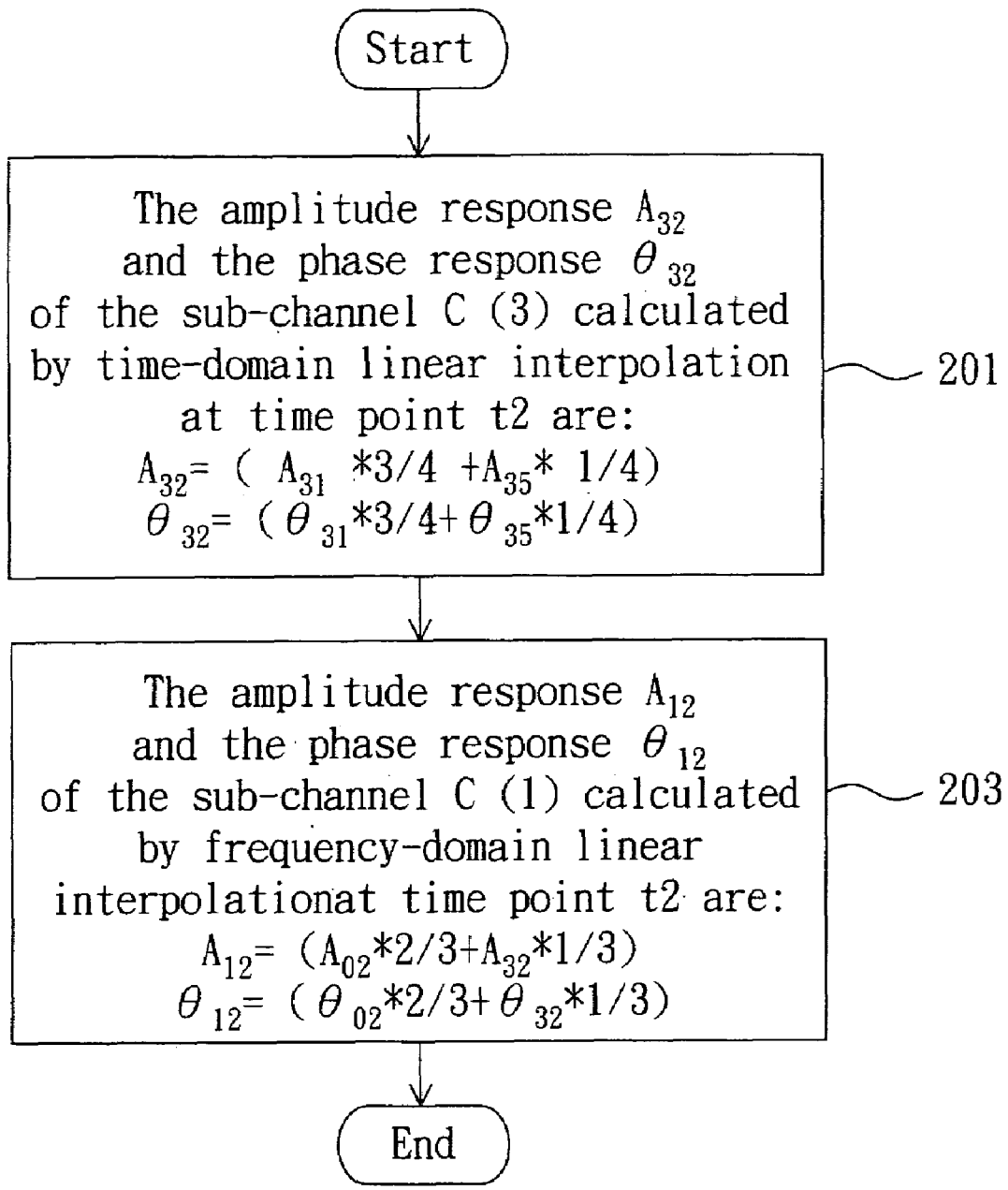
FIG. 2 (PRIOR ART) is a method flowchart of a conventional channel estimation.
Figure 3:
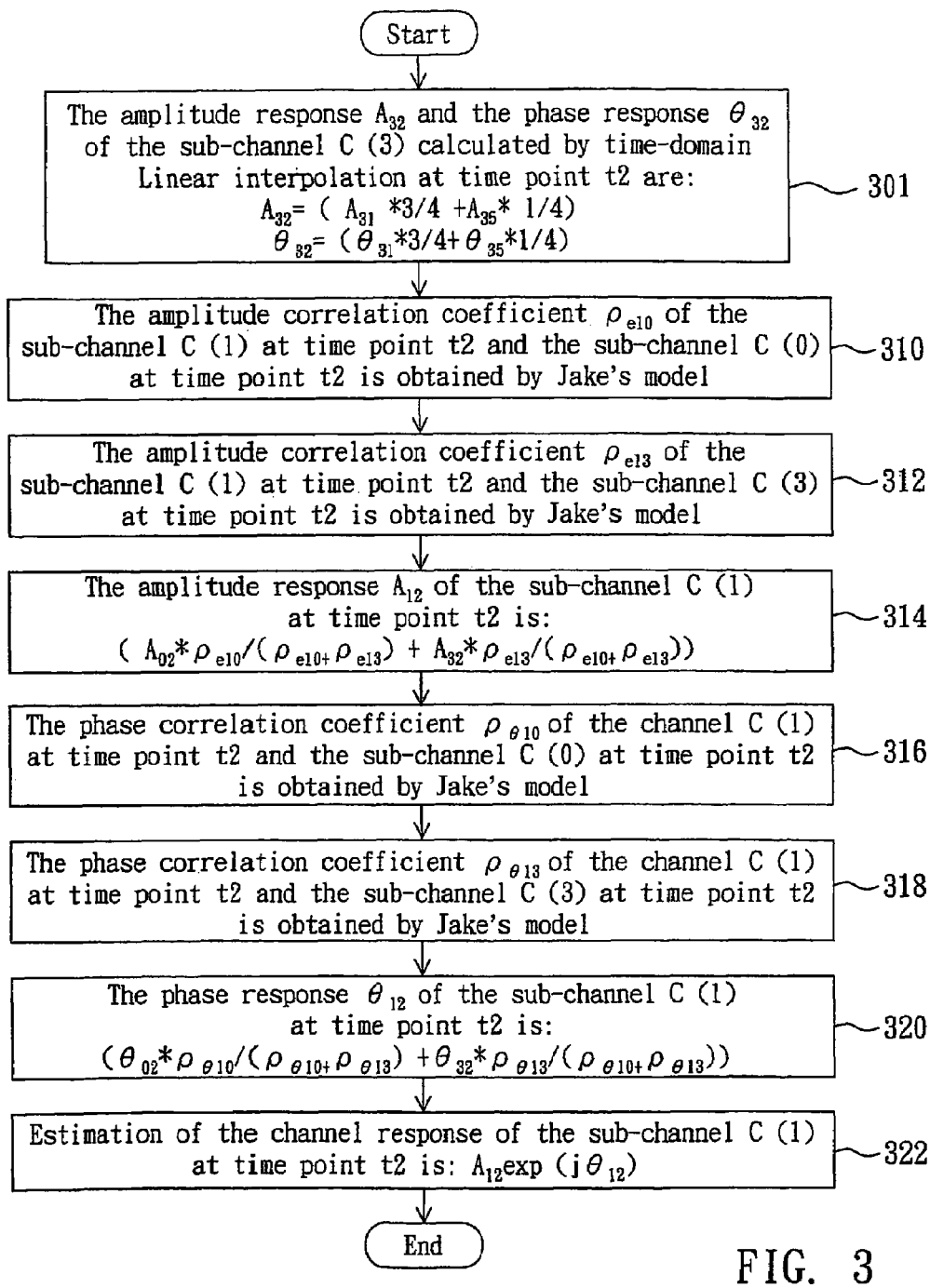
FIG. 3 is a method flowchart of channel estimation according to a preferred embodiment of the invention.

Referring to FIG. 3, a method flowchart of channel estimation according to a preferred embodiment of the invention is shown. The present embodiment is exemplified by the estimation of the channel response of sub-channel C (1) at time point t2. Referring to FIG. 1. The black points denote response signals, so the channel responses of the sub-channels are known. For example, the channel response of the sub-channel C (3) is $A_{31}*\exp(j\theta_{31})$ at the time point t1, the channel response of the sub-channel C (3) is $A_{35}*\exp(j\theta_{35})$ at the time point t5, wherein A is an amplitude response of the sub-channel, and $\theta$ is a phase response of the sub-channel. Firstly, the method begins at step 301, the amplitude response $A_{32}$ of the sub-channel C (3) at time point t2 is expressed as $A_{32}=(A_{31}*\frac{3}{4}+A_{35}*\frac{1}{4})$ and the phase response $\theta_{32}$ of the sub-channel C (3) at time point t2 is expressed as $\theta_{32}=(\theta_{31}*\frac{3}{4}+\theta_{35}*\frac{1}{4})$ by time-domain linear interpolation.

Next, proceed to steps 310-322, frequency-domain non-linear interpolation is applied according to Jake's model. Firstly, proceed to step 310, the amplitude correlation coefficient $\rho_{e10}$ of the sub-channel C (1) at time point t2 and the sub-channel C (0) at time point t2 is obtained according to formula (1). Next, proceed to step 312, the amplitude correlation coefficient $\rho_{e13}$ of the sub-channel C (1) at time point t2 and the sub-channel C (3) at time point t2 is obtained. Next, proceed to step 314, the amplitude response of the sub-channel C (1) at time point t2 is expressed as: $A_{12}=(A_{02}*\rho_{e10}/(\rho_{e10}+\rho_{e13})+A_{32}*\rho_{e13}/(\rho_{e10}+\rho_{e13}))$ Next, proceed to step 316, the phase correlation coefficient $\rho_{\theta10}$ of the channel C (1) at time point t2 and the sub-channel C (0) at time point t2 is obtained according to formula (2). Next, proceed to step 318, the amplitude correlation coefficient $\rho_{\theta13}$ of the sub-channel C (1) at time point t2 and the sub-channel C (3) at time point t2 is obtained. Next, proceed to step 320, the phase response of the sub-channel C (1) at time point t2 is expressed as:

$$\theta_{12}=(\theta_{02}*\rho_{\theta10}/(\rho_{\theta10}+\rho_{\theta13})+\theta_{32}*\rho_{\theta13}/(\rho_{\theta10}+\rho_{\theta13}))$$

Therefore, in step 322, the estimation of the channel response of the sub-channel C (1) at time point t2 is expressed as: $A_{12}\exp(j\theta_{12})$.

The time-domain linear interpolation of step 301 does not have to be performed in practical application because the channel response of a channel does not vary with the time significantly under normal circumstances. Therefore, the channel response of the sub-channel C (3) at time point t2 can be set to be equal to the channel response of the sub-channel C (3) at time point t1 or t5.

The method of channel estimation disclosed in the above embodiment of the invention accurately estimates the channel response of the channel by Jake's model so as to improve the quality of signal reception.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method of channel estimation used in an orthogonal frequency division multiplexing (OFDM) system, the method comprising steps of:

receiving a plurality of synchronized signals at a reception end of the OFDM system respectively from a plurality of sub-channels, wherein channel responses of an $i^{th}$ and a $j^{th}$ sub-channels are known, i+n=j, i, n and j are positive integers; and estimating the channel response of an $(i+k)^{th}$ sub-channel at the reception end of the OFDM system, according to the statistical properties derived from Jake's model and according to the channel responses of the $i^{th}$ and the $j^{th}$ sub-channels, wherein k<n and k is positive integer;

wherein the channel response of the $(i+k)^{th}$ sub-channel comprises an amplitude response $A_{i+k}$ and a phase response $\theta_{i+k}$, and the step of estimating the channel response comprises:

estimating at the reception end of the OFDM system the amplitude response $A_{i+k}$ of the $(i+k)^{th}$ sub-channel, comprising:

obtaining a first amplitude correlation coefficient $\rho_{e1}$ according to the sub-carrier frequency difference between the $(i+k)^{th}$ sub-channel and the ith sub-channel;

obtaining a second amplitude correlation coefficient $\rho_{e2}$ according to the sub-carrier frequency difference between the $(i+k)^{th}$ sub-channel and the $j^{th}$ sub-channel; and obtaining the amplitude response $A_{i+k}$ of the $(i+k)^{th}$ sub-channel according to the first amplitude correlation coefficient and the second amplitude correlation coefficient; and estimating at the reception end of the OFDM system the phase response $\theta_{i+k}$ of the $(i+k)^{th}$ sub-channel, comprising:

obtaining a first phase correlation coefficient $\rho_{\theta1}$ according to the sub-carrier frequency difference between the $(i+k)^{th}$ sub-channel and the $i^{th}$ sub-channel;

obtaining a second phase correlation coefficient $\rho_{\theta2}$ according to the sub-carrier frequency difference between the $(i+k)^{th}$ sub-channel and the $j^{th}$ sub-channel; and obtaining the phase response $\theta_{i+k}$ of the $(i+k)^{th}$ sub-channel according to the first phase correlation coefficient and the second phase correlation coefficient; and using the amplitude response $A_{i+k}$ of the $(i+k)^{th}$ sub-channel and the phase response $\theta_{i+k}$ of the $(i+k)^{th}$ sub-channel to compensate the received signal to obtain a corrected signal at the reception end of the OFDM system.

2. The method according to claim 1, wherein the amplitude response $A_{i+k}$ of the $(i+k)^{th}$ sub-channel is expressed as: $A_{i+k}=(A_i*\rho_{e1}/(\rho_{e1}+\rho_{e2})+A_j*\rho_{e2}/(\rho_{e1}+\rho_{e2}))$.

3. The method according to claim 1, wherein the phase response $\theta_{i+k}$ of the $(i+k)^{th}$ sub-channel is expressed as: $\theta_{i+k} = (\theta_i {}^* \rho_{\theta 1}/(\rho_{\theta 1}+\rho_{\theta 2}) + \theta_j {}^* \rho_{\theta 2}/(\rho_{\theta 1}+\rho_{\theta 2}))$.

4. The method according to claim 1, wherein the first amplitude correlation coefficient $\rho_{e1}$ is obtained according to the following formula:

$$\rho_{e1}(s, \tau) = \frac{J_0^2(\omega_m \tau)}{1 + s_1^2 \sigma^2}$$

wherein, $J_0$ is a zeroth order Bessel function of the first kind, $\omega_m$ is a Doppler frequency, $\tau$ is a time delay, $\sigma$ is a delay spread, $s_1$ is the sub-carrier frequency difference between the $(i+k)^{th}$ sub-channel and the $i^{th}$ sub-channel; wherein the above parameters $\omega_m$, $\tau$, $\sigma$ are known.

5. The method according to claim 1, wherein the second amplitude correlation coefficient $\rho_{e2}$ is obtained according to the following formula:

$$\rho_{e2}(s, \tau) = \frac{J_0^2(\omega_m \tau)}{1 + s_2^2 \sigma^2}$$

wherein, $J_0$ is a zeroth order Bessel function of the first kind, $\omega_m$ is a Doppler frequency, $\tau$ is a time delay, $\sigma$ is delay spread, $s_2$ is the sub-carrier frequency difference between the $(i+k)^{th}$ sub-channel and the $j^{th}$ sub-channel; wherein the above parameters $\omega_m$, $\tau$, $\sigma$ are known.

6. The method according to claim 1, wherein the first phase correlation coefficient $\rho_{\theta 1}$ is expressed as:

$$\rho_{\theta 1}(s_1, \tau) = 3\Gamma(\lambda, \phi)[1 + 2\Gamma(\lambda, \phi)] - \frac{1}{8}\Omega(\lambda)$$

-continued wherein, $\Gamma(\lambda, \phi) = \frac{1}{2\pi}\sin^{-1}(\lambda\cos\phi)$ $$\Omega(\lambda) = \frac{6}{\pi^2}\sum_{n=1}^{\infty}\frac{\lambda^{2n}}{n^2}, \Omega(1) = 1$$

$$\tan\phi = -s_1\sigma, \lambda^2 = \frac{J_0^2(\omega_m\tau)}{1 + s_1^2\sigma^2}$$

wherein, $J_0$ is a zeroth order Bessel function of the first kind, $\omega_m$ is a Doppler frequency, $\tau$ is a time delay, $\sigma$ is a delay spread, $s_1$ is the sub-carrier frequency difference between the $i^{th}$ sub-channel and the $(i+k)^{th}$ sub-channel; wherein the above parameter $\omega_m$, $\tau$, $\sigma$ are known.

7. The method according to claim 1, wherein the second phase correlation coefficient $\rho_{\theta 2}$ is expressed as:

$$\rho_{\theta 2}(s_2, \tau) = 3\Gamma(\lambda, \phi)[1 + 2\Gamma(\lambda, \phi)] - \frac{1}{8}\Omega(\lambda)$$

wherein, $\Gamma(\lambda, \phi) = \frac{1}{2\pi}\sin^{-1}(\lambda\cos\phi)$ $$\Omega(\lambda) = \frac{6}{\pi^2}\sum_{n=1}^{\infty}\frac{\lambda^{2n}}{n^2}, \Omega(1) = 1$$

$$\tan\phi = -s_2\sigma, \lambda^2 = \frac{J_0^2(\omega_m\tau)}{1 + s_2^2\sigma^2}$$

wherein, $J_0$ is a zeroth order Bessel function of the first kind, $\omega_m$ is a Doppler frequency, $\tau$ is a time delay, $\sigma$ is a delay spread, $s_2$ is the sub-carrier frequency difference between the $(i+k)^{th}$ sub-channel and the $j^{th}$ sub-channel; wherein the above parameters $\omega_m$, $\tau$, $\sigma$ are known.

* * * * *